US012670160B1

(12) United States Patent
Tormasov et al.

(10) Patent No.: US 12,670,160 B1
(45) Date of Patent: Jun. 30, 2026

(54) AGGREGATION OF A PLURALITY OF ARTIFICIAL INTELLIGENCE KNOWLEDGE MODELS

(71) Applicants: Constructor Technology AG, Schaffhausen (CH); Constructor Education and Research Genossenschaft, Schaffhausen (CH)

(72) Inventors: Alexander Tormasov, Busingen am Hochrhein (DE); Andrey Adashchik, Istanbul (TR); Serg Bell, Singapore (SG); Stanislav Protasov, Singapore (SG); Nikolay Dobrovolskiy, Alanya (TR); Laurent Dedenis, Geneva (CH)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/005,934

(22) Filed: Dec. 30, 2024

(51) Int. Cl.
*G06F 16/2453* (2019.01)
*G06F 16/242* (2019.01)
*G06F 16/248* (2019.01)

(52) U.S. Cl.
CPC ...... *G06F 16/24542* (2019.01); *G06F 16/243* (2019.01); *G06F 16/248* (2019.01)

(58) Field of Classification Search
None
See application file for complete search history.

(56) References Cited

U.S. PATENT DOCUMENTS 12,373,649 B1 * 7/2025 Mathews .............. G06F 16/243
12,493,803 B1 * 12/2025 Pathak .................. G06F 40/289
12,511,282 B1 * 12/2025 Ojha ................. G06F 16/24522
12,517,913 B1 * 1/2026 Mancuso .......... G06F 16/24578
2019/0213260 A1 * 7/2019 Bacarella .............. H04L 67/104
2024/0185001 A1 * 6/2024 Nagaraju .............. G06F 40/284
2025/0138986 A1 * 5/2025 Bazzo ................... G06F 11/362
2025/0148020 A1 * 5/2025 Padmashali ............ G06N 20/00
2025/0231973 A1 * 7/2025 Kelsey ................ G06F 16/3329
2025/0236314 A1 * 7/2025 Buyval .................... G06N 7/01
2025/0248666 A1 * 8/2025 Vakili .................... A61B 5/749
(Continued)

OTHER PUBLICATIONS

Exploring Web Scale Language Models for Search Query Processing (Year: 2010).*

*Primary Examiner* — Kim T Nguyen
(74) *Attorney, Agent, or Firm* — ArentFox Schiff LLP; Michael Fainberg

(57) ABSTRACT

Disclosed herein are systems and methods for aggregating knowledge from a plurality specialized knowledge models (KMs). In one aspect, an exemplary method includes: receiving a query; analyzing the query to determine that the query is directed to different subject matter areas; selecting a plurality of specialized KMs each having respective expertise in one of the different subject matter areas of the query; generating a first sub-query directed to the first subject matter of the query and a second sub-query directed to the second subject matter of the query; transmitting the first sub-query for processing by the selected first specialized KM; obtaining a first response from the first specialized KM based on the first sub-query; transmitting the second sub-query and the first response from the first specialized KM for processing by the selected second specialized KM; and generating an aggregated response from the second specialized KM.

20 Claims, 9 Drawing Sheets

(56) References Cited

U.S. PATENT DOCUMENTS

| | | | | |
|---|---|---|---|---|
| 2025/0248667 | A1* | 8/2025 | Vakili | A61B 5/14532 |
| 2025/0252111 | A1* | 8/2025 | Aggarwal | G06F 16/24578 |
| 2025/0258855 | A1* | 8/2025 | Ustyuzhanin | G06F 16/3322 |
| 2025/0378305 | A1* | 12/2025 | Hsieh | G06F 16/243 |
| 2026/0010531 | A1* | 1/2026 | Jain | G06F 16/24542 |

* cited by examiner

300

400b

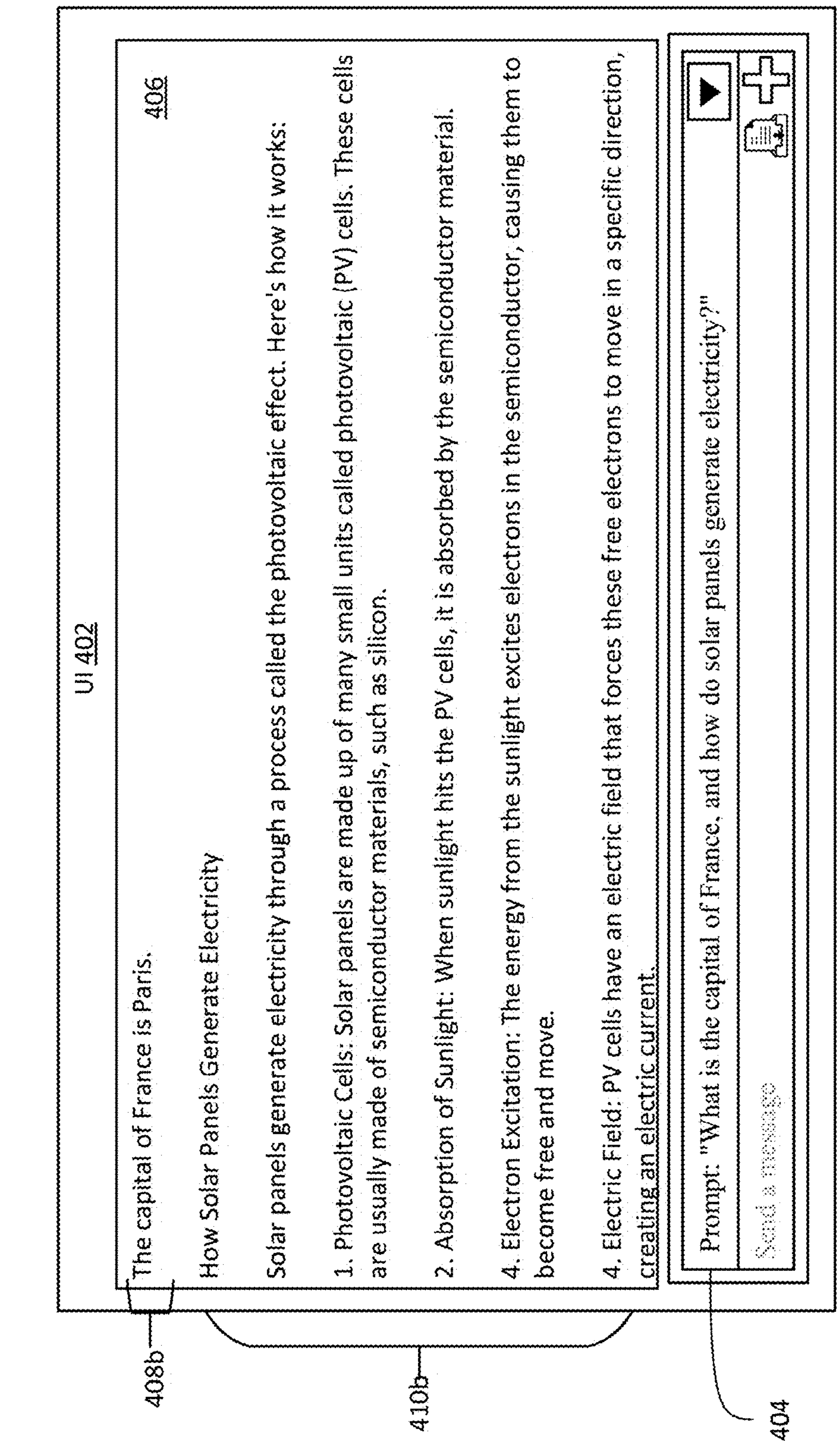

The capital of France is Paris.

How Solar Panels Generate Electricity

Solar panels generate electricity through a process called the photovoltaic effect. Here's how it works:

1. Photovoltaic Cells: Solar panels are made up of many small units called photovoltaic (PV) cells. These cells are usually made of semiconductor materials, such as silicon.

2. Absorption of Sunlight: When sunlight hits the PV cells, it is absorbed by the semiconductor material.

4. Electron Excitation: The energy from the sunlight excites electrons in the semiconductor, causing them to become free and move.

4. Electric Field: PV cells have an electric field that forces these free electrons to move in a specific direction, creating an electric current.

406

Prompt: "What is the capital of France, and how do solar panels generate electricity?"

Send a message

408b

410b

404

AGGREGATION OF A PLURALITY OF ARTIFICIAL INTELLIGENCE KNOWLEDGE MODELS

FIELD OF TECHNOLOGY

The present disclosure relates to the field of machine learning models (MLMs), and, more specifically, to systems and methods for aggregating knowledge from a plurality of specialized knowledge models (KMs).

BACKGROUND

Knowledge models (KMs) are structured representations of information within a specific domain, often using frameworks like ontologies, taxonomies, or knowledge graphs to organize concepts and their relationships. These models provide a foundation for storing, retrieving, and reasoning with factual data, ensuring consistency and accuracy in decision-making. When combined with machine learning models (MLMs) such as large language models (LLMs), which excel at understanding and generating human-like text, knowledge models enhance the ability to process and respond to complex queries. LLMs use natural language to interpret and articular information, while knowledge models supply structured, factual data to ground these responses. Together, KMs and LLMs create systems that integrate the contextual understanding of language with reliable, domain-specific knowledge for applications ranging from conversational AI to advanced decision-support systems.

SUMMARY

To address the shortcomings of responses provided by MLMs when a query is directed different subject matter areas, the present disclosure describes aggregating knowledge from a plurality of specialized knowledge models to improve responses from MLMs. Some of the technical improvements of the present disclosure include domain-specific accuracy. By incorporating knowledge from multiple specialized knowledge models, MLMs may generate more accurate responses tailored to specific domains (e.g., medical, legal, or technical fields). Specialized knowledge models help mitigate errors or hallucinations in MLMs by providing validated domain-specific information. Accordingly, aggregating knowledge allows the MLMs to access the most relevant knowledge model for a given query, ensuring responses are contextually appropriate. Furthermore, combining insights from different models enables the MLMs to provide well-rounded answers, particularly for interdisciplinary queries. For example, different knowledge models may complement each other, filling gaps in knowledge that a single model or dataset might have.

In addition, the present disclosure describes a benefit of scalability and adaptability. For example, adding or updating specialized knowledge models improves scalability, as new expertise may be incorporated without retraining MLMs. Furthermore, queries may be dynamically routed to the appropriate knowledge model, making the system highly adaptable to a wide range of use cases. Some other technical improvements of the present disclosure include improved query understanding by fine-tuning query parsing and enhanced reasoning. As an example, knowledge models can help the MLM interpret nuanced or technical queries by mapping the queries to structured data representations. In addition, aggregating local and rule-based reasoning from specialized models allows the MLM to perform more complex inferences.

Furthermore, the present disclosure may reduce computational load due to targeted retrieval and smaller fine-tuning needs. Instead of relying on the MLM to recall information from its training data, specialized knowledge models provide precise, curated information, reducing computational overhead. As such, MLMs may remain general-purpose while specialized knowledge models provide depth, which minimizes the need for extensive domain-specific fine-tuning. Aggregating specialized knowledge models with MLMs leads to a robust, flexible system that delivers precise, reliable, and contextually rich responses, enhancing their effectiveness across various domains and applications.

In one exemplary aspect, a method aggregating knowledge from a plurality of knowledge models is disclosed, the method comprising: receiving a query from a user; analyzing, using a query analyzer machine language model (MLM), the query to determine that the query is directed to two or more different subject matter areas; selecting, from a knowledge model registry comprising information about a plurality of specialized knowledge models each having a distinct subject matter expertise, the plurality of specialized knowledge models each having respective expertise in one of the two or more different subject matter areas of the query; generating, using a query generator, a first sub-query directed to the first subject matter of the query and a second sub-query directed to the second subject matter of the query; transmitting the first sub-query for processing by the selected first specialized knowledge model having expertise in the subject matter of the first sub-query; obtaining a first response from the first specialized knowledge model based on the first sub-query; transmitting the second sub-query and the first response from the first specialized knowledge model for processing by the selected second specialized knowledge model having expertise in the subject matter of the second sub-query; and generating, for display on a user interface (UI), an aggregated response from the second specialized knowledge model, wherein the aggregated response combines knowledge from both the first specialized knowledge model and the second specialized knowledge model.

In some aspects, the techniques described herein relate to a method, wherein the query generator comprises an natural language processing LLM, and first sub-query and a second sub-query comprise two different natural language queries.

In some aspects, the techniques described herein relate to a method, wherein the query generator comprises a MLM prepared for processing physical data models based at least in part on transmitting data in iterations or in a sequence.

In some aspects, the techniques described herein relate to a method, wherein the query generator includes an embeddings generator model, and first sub-query and a second sub-query include two different embedding vectors.

In some aspects, the techniques described herein relate to a method, wherein the first response and aggregated response include one of natural language or an embeddings vector.

In some aspects, the techniques described herein relate to a method, the method further comprising generating, for display on the UI, each response from the first specialized knowledge model or the second specialized knowledge model.

In some aspects, the techniques described herein relate to a method, wherein the first specialized knowledge model and the second specialized knowledge model correspond to at least one of a Retrieval-Augmented Generation (RAG), Low-Rank Adaption (LORA), or Graph Neural Networks (GNN).

In some aspects, the techniques described herein relate to a method, the method further comprising: transmitting a request to an application programming interface (API) for the first specialized knowledge model with the query, wherein the API processes the query by routing the query to the first specialized knowledge model for processing the query and generating the first response; and transmitting a request to an API for the second specialized knowledge model with the query and the first response, wherein the API processes the query by routing the query and the first response to the second specialized knowledge model for processing the query and generating the aggregated response.

In some aspects, the techniques described herein relate to a method, the method further comprising: training the query analyzer LLM to determine if the query is directed to two or more different subject matter areas based on using a training dataset comprising at least queries including examples of single-subject queries and multi-subject queries.

In some aspects, the techniques described herein relate to a method, wherein analyzing the query to determine if the query is directed to two or more different subject matter areas by: performing a tokenization process by breaking down the query into tokens for the query analyzer LLM model to process; and using n-grams to capture context and relationships between words.

In some aspects, the techniques described herein relate to a method, the method further comprising: training the first specialized knowledge model having expertise in the subject matter of the first sub-query based on using a training dataset comprising domain-specific data in the subject matter of the first sub-query to master at least one of language, concepts, or reasoning within a particular field; and training the second specialized knowledge model having expertise in the subject matter of the second sub-query based on using a training dataset comprising domain-specific data in the subject matter of the second sub-query to master at least one of language, concepts, or reasoning within a particular field.

In some aspects, the techniques described herein relate to a method, wherein the query generator is configured to: process the query and identify distinct subject matters using the query generator, classify the distinct subject matters by using a Latent Dirichlet Allocation (LDA) or pre-trained topic classifier to determine the subject of different segments of the query, and generate sub-queries for each subject matter.

In some aspects, the techniques described herein relate to a method, wherein the information for specialized knowledge model comprises at least one of: a model name, subject matter expertise that the specialized knowledge model is trained to handle, a version or iteration of the specialized knowledge model, base model architecture, model type, fine-tuning dataset used to fine-tune the specialized knowledge model for its specific subject matter expertise, a number of parameters, accuracy/precision/recall/F1 score, benchmarks, inference speed, resource requirements, training data sources, training time, hardware used, optimization techniques, or API detail, deployment requirements, update date, or license information.

In some aspects, the techniques described herein relate to a method, wherein the specialized knowledge model is an object comprising a MLM with API for questions-answers and associated annotation from the knowledge model registry.

In some aspects, the techniques described herein relate to a method, wherein transmitting the second sub-query and the first response from the first specialized knowledge model further comprises: in response to obtaining a first prompt from the user, adding the query and the obtained first response from the first specialized knowledge model to the second sub-query; and in response to obtaining a second prompt from the user, adding a prompt for answering the second sub-query in context with the obtained first response from the first specialized knowledge model to the second sub-query.

According to one aspect of the disclosure, a system is provided for aggregating knowledge from a plurality specialized knowledge models, the system comprising at least one memory; and at least one hardware processor coupled with the at least one memory and configured, individually or in combination to: receive a query from a user; analyze, using a query analyzer MLM, the query to determine that the query is directed to two or more different subject matter areas; select, from a knowledge model registry comprising information about a plurality of specialized knowledge models each having a distinct subject matter expertise, the plurality of specialized knowledge models each having respective expertise in one of the two or more different subject matter areas of the query; generate, using a query generator, a first sub-query directed to the first subject matter of the query and a second sub-query directed to the second subject matter of the query; transmit the first sub-query for processing by the selected first specialized knowledge model having expertise in the subject matter of the first sub-query; obtain a first response from the first specialized knowledge model based on the first sub-query; transmit the second sub-query and the first response from the first specialized knowledge model for processing by the selected second specialized knowledge model having expertise in the subject matter of the second sub-query; and generate, for display on a user interface (UI), an aggregated response from the second specialized knowledge model, wherein the aggregated response combines knowledge from both the first specialized knowledge model and the second specialized knowledge model.

In one exemplary aspect, a non-transitory computer-readable medium is provided storing a set of instructions thereon for aggregating knowledge from a plurality specialized knowledge models, wherein the set of instructions comprises instructions for: receiving a query from a user; analyzing, using a query analyzer MLM, the query to determine that the query is directed to two or more different subject matter areas; selecting, from a knowledge model registry comprising information about a plurality of specialized knowledge models each having a distinct subject matter expertise, the plurality of specialized knowledge models each having respective expertise in one of the two or more different subject matter areas of the query; generating, using a query generator, a first sub-query directed to the first subject matter of the query and a second sub-query directed to the second subject matter of the query; transmitting the first sub-query for processing by the selected first specialized knowledge model having expertise in the subject matter of the first sub-query; obtaining a first response from the first specialized knowledge model based on the first sub-query; transmitting the second sub-query and the first response from the first specialized knowledge model for processing by the selected second specialized knowledge model having expertise in the subject matter of the second sub-query; and generating, for display on a user interface (UI), an aggregated response from the second specialized knowledge model, wherein the aggregated response combines knowledge from both the first specialized knowledge model and the second specialized knowledge model.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 4A-4B are diagrams illustrating a method for generating a response with aggregated knowledge from two knowledge models according to aspects of the present disclosure.

Like reference numbers and designations in the various drawings indicate like elements.

DETAILED DESCRIPTION

Figure 1:
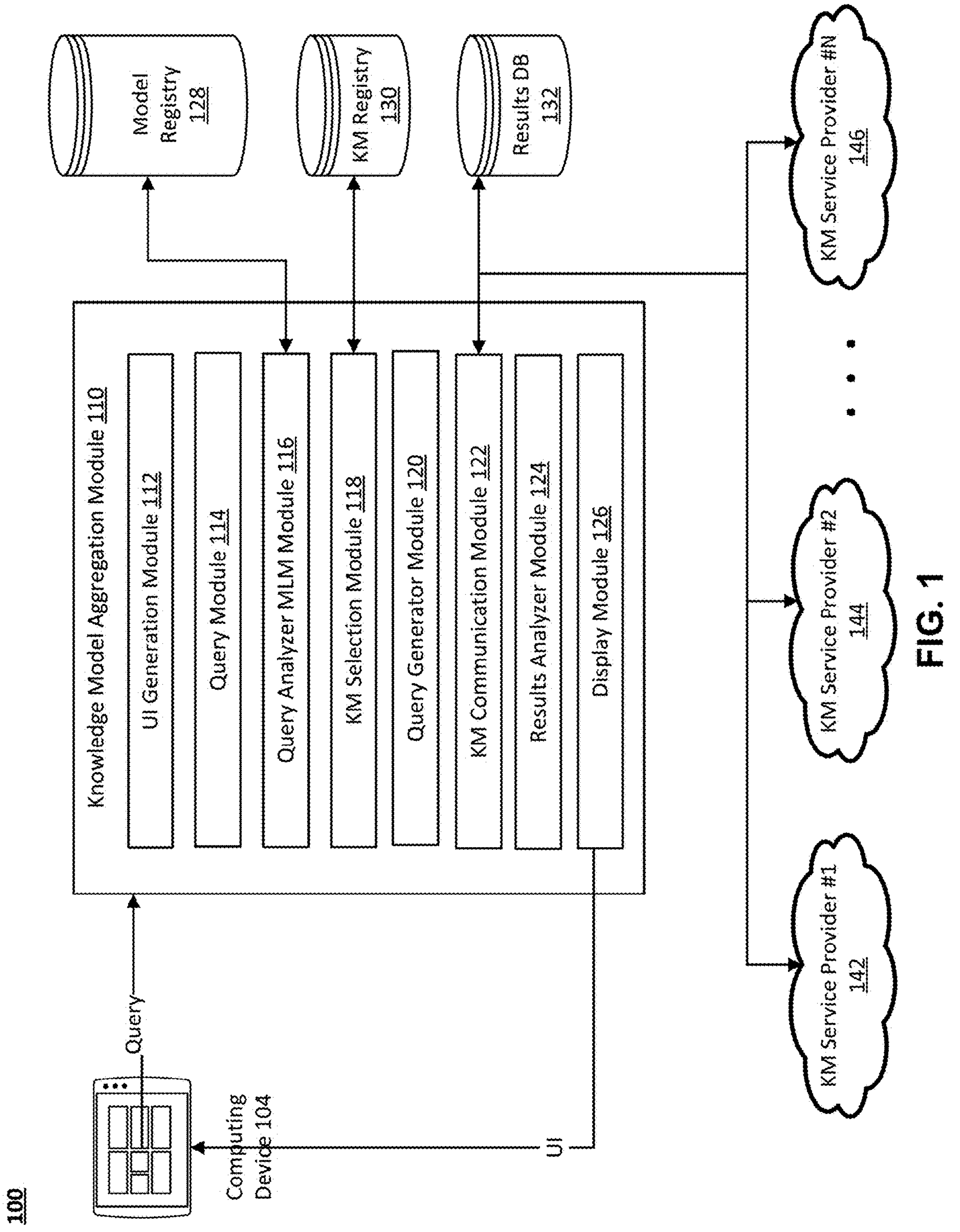
FIG. 1 is a block diagram illustrating a system for aggregating knowledge from a plurality specialized knowledge models according to aspects of the present disclosure.

Exemplary aspects are described herein in the context of a system, method, and computer program product for aggregating knowledge from a plurality specialized knowledge models. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Different machine learning models (MLMs) (e.g., large language models (LLMs)) may provide different responses to a same prompt due to a complex interplay of factors, including training data, model architecture, training objectives, inference techniques, preprocessing steps, and prompt design. First, different MLMs are trained on different datasets, which can vary in size, diversity, and quality. For example, a particular model may be trained on a dataset that includes more scientific literature, while another might have more conversational data. In addition, training data may introduce biases that affect a particular model's responses. As an example, if a model's dataset has more examples of a particular type of language or viewpoint, then that difference will be reflected in its response. Second, different MLMs may have different architectures. For example, GPT-3 and BERT are both transformer-based models but are designed for different tasks and have different internal structures. Third, training objectives between the MLMs may be different. For example, some models may be fine-tuned for specific tasks, such as question answering, summarization, or translation. Fourth the different MLMs may have different inference techniques. As a non-limiting example, the methods used to generate text during inference may vary such that different strategies can produce different responses even from the same model. Parameters like temperature and top-k sampling can also affect randomness and creativity of the generated text.

Accordingly, users are often forced to choose between using a single LLM at a time since each LLM generally has their own interface and/or application for the user to interact with the LLM. Some platforms provide web-based interfaces where users may directly interact with LLMS by typing in prompts and receiving responses. Application Programing Interfaces (APIs) may also allow developers to integrate LLM capabilities into their own applications.

Knowledge models can significantly enhance LLMs by complementing their general-purpose language capabilities with structured, domain-specific, or up-to-date knowledge. For instance, while LLMs may hallucinate or provide outdated information, specialized knowledge models offer a stable and reliable reference point for factual data. In addition, knowledge models are trained on domain-specific data (e.g., medical knowledge models, legal database, etc.) such that knowledge models enhance LLMs with niche expertise, making them useful for specific tasks or queries that contain different subject matter. It should be noted that although the present disclosure is described in terms of LLMs for illustrative purposes only and that the present disclose may be applied to any type of MLM.

The present disclosure describes various aspects of improving responses from multiple MLMs by aggregating knowledge from specialized knowledge models. A first aspect involves determining whether a query is directed to different subject matter areas using a query analyzer MLM. A second aspect involves selecting specialized knowledge models each having respective expertise in different subject matter areas. A third aspect involves generating sub-queries directed to different subject matter of the query. A fourth aspect involves transmitting a second sub-query to a specialized knowledge model with at least a response from a first response from a first specialized knowledge mode such that the aggregated response combines knowledge from at least a first specialized knowledge model and a second specialized knowledge model.

Turning now to the figures, example aspects are depicted with reference to one or more components described herein, where components in dashed lines may be optional.

FIG. 1 is a block diagram illustrating a system 100 configured to aggregate knowledge from a plurality specialized knowledge models. In one aspect, the components of system 100 may be implemented on computer systems, such as that shown in FIG. 7.

The system 100 may be used to analyze a query and generate a response to the query by aggregating knowledge from two or more knowledge models. Generally, the knowledge model aggregation module 110 is configured to analyze the query to categorize the subject matters included in the query, select a plurality of specialized knowledge models each having a respective expertise in a particular subject matter, and generate an aggregated response that combines knowledge from the selected specialized knowledge models. This provides a way for a MLM to leverage specialized knowledge models related to different subject matter to provide an aggregated response that combines knowledge from multiple knowledge models when responding to a query.

In one aspect, the system 100 includes at least a computing device 104, a plurality of knowledge model service providers 142, 144, 146 each connected to a respective knowledge model, a knowledge model aggregation module 110, a model registry 128, a knowledge model registry 130, and a results database 132. Users of the computing device 104 may communicate with the knowledge model service providers 142, 144, 146 via the knowledge model aggregation module 110. Notably, the knowledge models of the present embodiment may be implemented on a cloud server, local server, or local devices. As an example, the knowledge model aggregation module 110 may be hosted on a cloud server or allocated at a local device.

Each knowledge model service provider 142, 144, 146 may each connect to a different knowledge model that has a distinct subject matter expertise. These knowledge models are structured frameworks used to represent, organize, and manage knowledge within a specific domain or across multiple domains. A user may leverage knowledge models to answer a query by utilizing their structured representation of information to retrieve, infer, or analyze relevant data. The process typically involves understanding the query's intent, matching it with the model's knowledge database, and then delivering an accurate response. In some aspects, the knowledge model may correspond to at least one of a Retrieval-Augmented Generation (RAG), Low-Rank Adaption (LORA), or Graph Neural Networks (GNN).

Accordingly, if a query involves multiple subject matters, then it would be advantageous to take advantage of different specialized knowledge models in order to generate an aggregated response combining knowledge from multiple specialized knowledge model service providers 142, 144, 146 rather than to rely on just one knowledge model. It is noted that the system 100 includes any number of knowledge model service providers and FIG. 1 only shows the components relevant for the illustrative example of the present disclosure.

In some aspects, the system 100 may include a knowledge model aggregation module 110 configured to process a query from a computing device 104 from a user and generate, select, and transmit a prompt based on the query into different knowledge model service providers 142, 144, 146. In this way, the computing device 104 may be configured to display an aggregated response that combines knowledge from several specialized knowledge models. The computing device 104 may execute a plurality of modules in the knowledge model aggregation module 110 that together make up at least an interface to interact with different knowledge model service providers. The knowledge model aggregation module 110 may include at least the following functional modules: a UI generation module 112, a query module 114, a query analyzer MLM module 116, a knowledge model selection module 118, a query generator module 120, a knowledge model communication module 122, a results analyzer module 124, and a display module 126. Some of these functional modules may be deployed locally on servers, hosted on remote servers, or on local devices.

The computing device 104 may execute a UI generation module 112 to implement a UI for display on the computing device 104 that is configured to receive input from the computing device 104 and provide feedback from at least two of the KM service providers 142, 144, 146. In some aspects, the UI generation module 112 generates a UI (as will be described in more detail in FIGS. 4A-4B and 5A-5B) and layout and components of the UI elements (e.g., menus, buttons, forms, grids, etc.) based on predefined rules, data models, or templates. In some aspects, the UI generation module 112 may also be configured to automatically adjust the UI elements based on the content or data that it needs to display such as adapting a form to input fields or displaying a list of items. In some aspects, the UI generation module 112 may also be configured to adapt the UI to different screen sizes and resolutions by making sure that the UI works well across various devices.

In some aspects, the user interface may be implemented as web-based interface or a desktop application. The user interface allows users to use text queries, prompts, and/or upload files to query knowledge model service providers 142, 144, 146 for answers to specific questions.

The computing device 104 may also execute a query module 114 configured to obtain a query from a computing device 104 of a user. Generally, the query module 114 is configured to act as an intermediary layer in MLM-based systems by enhancing a MLM model's ability to understand, interpret, and respond to user queries effectively. Specifically, the query module 114 may be configured to handle and interpret user queries and generate a prompt from the query that is formatted in a way that a knowledge models from the knowledge model service providers 142, 144, 146 may process based on its respective specialized knowledge. The primary role of the query module 114 is to bridge the gap between raw user input from the computing device 104 and at least one of the underlying knowledge model service providers 142, 144, 146. In some aspects, the query module 114 may be equipped with natural language understanding for analyzing and interpreting the query to understand its intent, context, and meaning. This may involve recognizing entities, key phrases, intents, and relationships within the query.

As an example, a user may use the computing device 104 to enter a query for input as a prompt into a MLM. In some aspects, the query module 114 may prepare the query as a prompt for input into at least one knowledge model service provider 142, 144, 146 by cleaning and normalizing the text. As an non-limiting example, this may involve: removing unnecessary punctuations, special characters, or stop words; correcting spelling or grammatical errors; or converting different forms of data (e.g., dates, numbers, or units) into a standardized format. By identifying the user's intent behind the query (e.g., asking a question, requesting information, or performing a task), the query module 114 ensure that an appropriate LLM service provider may determine the appropriate type of response or action.

The computing device 104 may execute a query analyzer MLM module 116 configured to analyze the query to determine whether the query is directed to two or more different subject matter areas and to identify the subject matter. Specifically, a MLM analyzes the query to determine if it pertains to multiple subject matter areas and to identify those areas using several key techniques. First, the query may be preprocessed by tokenizing the query into individual words or phrases, tagging part-of-speech by identifying nouns, verbs, adjectives, etc. to understand the grammatical structure, or identify specific entities like locations, organizations, dates, or other domain-specific terms. Second, features are extracted to measure how important words are in the query related to a corpus. For example, words or phrases can be converted into dense vector representations for preserving semantic similarity. In addition, the grammatical structure may be analyzed to understand relationships between words. Third, classification or clustering is performed by using algorithms like Latent Dirichlet Allocation (LDA) or Non-Negative Matrix Factorization (NMF) to assign words or phrases in the query to different topics. A supervised learning approach may be used to assign multiple labels (e.g., subject areas) to the query. In addition, similar parts of the query may grouped into clusters that correspond to different subject matters. Fourth, segmentation may be performed to split the query into distinct logical segments based on grammatical dependencies or breaking the query into units based on semantic meaning, identifying possible shifts in context or topics. Fifth, knowledge base integration may include linking keywords and phrase in the query to predefined categories or hierarchies in a knowledge base. For example, domain-specific dictionaries may be used to enhance identification by comparing query terms to dictionaries or databases related to specific subject areas. Post-processing may be used for contextual disambiguation by using surrounding words or phrases to refine the understanding of ambiguous terms and/or for cross-domain classification to determine if identified subject matters fall into distinct domains based on learned domain boundaries.

As an example, a query may ask "What are the benefits of AI in healthcare and finance?" The query analyzer MLM module 116 may preprocess the query to tokenize, remove stop words, and identify named entities ("AI", "healthcare", "finance"). The query analyzer MLM module 116 may then extract features by embedding terms using Bidirectional Encoder Representations from Transformers (BERT), determine context and similarity to known domains. The query analyzer MLM module 116 may then perform classification such as outputting two labels-healthcare and finance. The query analyzer MLM module 116 may then perform segmentation to identify two topic areas by grouping terms related to healthcare and finance separately.

As an example, the query analyzer MLM module 116 may correspond to a LLM. A LLM is an advanced artificial intelligence system designed to understand and generate human-like text. These models are trained on vast amounts of data, enabling them to comprehend context, recognize patterns, and produce coherent and contextually relevant responses. LLMs are utilized in various applications, including chatbots, content creation, and language translation. Their ability to process and generate natural language makes them powerful tools for enhancing communication and automating tasks that require language understanding. However, the LLM modules must first go through preparing (e.g., training, retraining, distillation, fine-tuning, etc.) to teach each LLM model to perform their respective specific tasks. As a nonlimiting example, the LLM models may incorporate one of the machine learning models listed below.

A transformer is a deep learning architecture used in LLMs. The transformer has an encoder/decoder structure with numerous stacked multi-head attention layers and feed forward network layers. This architecture allows the model to process and generate text effectively, capturing long-range dependencies and contextual information. Transformer are well-suited for tasks like natural language processing, and image classification and generation. Common examples of transformer models are generative pre-trained transformer (GPT) and BERT.

A classification model is a type of machine learning model that is designed to predict the category or class to which a given data point belongs to. The classification model works by analyzing input features and assigning them to one of several predefined labels. These models are trained on labeled data, where the correct category is known, and they learn patterns that allow them to make predictions on new, unseen data. Examples of classification models include at least a regression model used for binary classification, a decision tree used to predict class by splitting data based on feature values, support vector machine (SVM) configured to perform classification by finding the best boundary between classes, and neural networks.

In some examples, the query analyzer MLM module 116 may comprise one or more neural networks, which are a class of machine learning models inspired by the structure and functioning of the human brain. They consist of interconnected nodes, called neurons or artificial neurons, organized into layers. Neural networks are capable of learning complex patterns and representations from data. The neural network executed by the query analyzer MLM module 116 may be one of the following: transformer neural network, convolution neural network (CNN), recurrent neural network (RNN), long short-term memory (LSTM) network, gated recurrent unit (GRU) network, autoencoder, generative adversarial network (GAN).

An autoencoder is a type of neural network used for unsupervised learning and dimensionality reduction, and consists of an encoder that compresses input data into a lower-dimensional representation (encoding) and a decoder that reconstructs the original input from the encoding.

For classification tasks such as identifying subject matter in a query, an untrained MLM in the query analyzer MLM module 116 will first analyze data from a training set to "learn" the correct answers and identify the different subject matters in the query. As an example, the training dataset may include at least queries including examples of single-subject queries and multi-subject queries.

During training of the query analyzer MLM module 116, the training dataset will comprise data corresponding to single-subject queries and multi-subject queries that are input through the untrained MLM in the query analyzer MLM module 116. The results from the untrained MLM are then compared with known data set results using the corresponding labels identifying the queries as single-subject queries or multi-subject queries. It should be noted that the input to the trained MLM in the query analyzer MLM module 116 will be data from the training dataset.

For every input training sample from the training dataset, the trained MLM from query analyzer MLM module 116 will produce a prediction consisting of values representing a probability that a particular query is a single-subject query or a multi-subject query. The output with the highest probability determines the predicted grading for the answer. A class label for each answer may be used to compute a loss (e.g., loss function).

The prepared MLM from the query analyzer MLM module 116 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal. In some examples, an appropriate loss function, such as Mean Squared Error (MSE) for regression tasks (e.g., predicting brightness levels) or a Cross-Entropy Loss for classification tasks (e.g., detecting specific color changes).

Once the MLM is trained (e.g., inference), the prepared MLM from the query analyzer MLM module 116 may evaluate the answers for accuracy by comparing them with correct predictions of whether the query is single-subject query or a multi-subject query.

During inference, the trained MLM from the query analyzer MLM module 116 does not re-evaluate or adjust the layers of the neural network based on the results. Instead, the inference applies knowledge from the trained neural network and uses it to infer a result (e.g., correct, partially correct, or incorrect). Accordingly, when a new unknown dataset (e.g., answers from an examination) is input through the trained neural network in the trained MLM of the query analyzer MLM module 116, the trained MLM outputs a prediction of whether the query is a single-subject query or a multi-subject query based on predictive accuracy of the MLM.

In some aspects, an optimizer such as Adam or SGD may be used to train the models in the query analyzer MLM module 116. In some aspects, the data may be split into training, validation, and test sets. In these aspects, the models from the query analyzer MLM module 116 are trained on the training dataset and then validated by the validation sets in order to tune hyperparameters.

In some aspects, the query analyzer MLM module 116 may utilize a MLM such as LLM to identify the subject matters present in the query. For example, a MLM like BERT used to identify subject matter present in the query involves leveraging the MLM's contextual understanding capabilities to infer the subject or topic embedded in the text. The steps may include understanding the query context. For example, the query can contain keyword or phrases that give away its subject. MLMs may be pretrained to understand relationships between words in context. Next, steps should be taken to identify the subject matter. For example, tokenizers associated with the MLM (E.g., BERTTokenizer) may break the query into tokens. Next, key parts of the query may be masked. In this way, the MLM may predict missing parts by replacing parts of the query (e.g., nouns, verbs) with the [MASK] token, which can highly the subject. The query is then passed through the MLM to predict the [MASK] token such that the model will return a ranked list of potential tokens that best fit the context. Then, the process involves extracting the most probable predictions for the masked token. These predictions often reflect the subject matter. Beyond the [MASK] prediction, the process may also analyze the context of the entire query. MLMs like BERT can output embeddings that can be clustered or classified to identify broader subjects.

In some aspects, MLM predictions combined with NLP techniques like clustering or TD-IDF may be used to identify the subject across multiple queries. In some aspects, embeddings can be extracted for comparison with pre-defined topic vectors to identify query subject matter. In some aspects, the MLM can be fine-tuned on labeled data to classify queries into predefined subjects.

The computing device 104 may execute a knowledge model selection module 118 configured to select at least two specialized knowledge models each having respective expertise in one of the two or more different subject matter areas of the query from a knowledge model registry 130 comprising information about a plurality of specialized knowledge models each having a distinct subject matter expertise. The plurality of specialized knowledge models from the knowledge model service providers 142, 144, 146 each having respective expertise in one of the two or more different subject matter areas of the query.

The computing device 104 may execute a query generator module 120 configured to generate at least a first sub-query directed to the first subject matter of the query and a second sub-query directed to the second subject matter of the query to respective specialized KMs from the KM service providers 142, 144, 146. In some aspects, the query generator module 120 may comprise a natural language processing MLM. In some aspects, the query generator module 120 may comprise a MLM prepared for processing physical data models based at least in part on transmitting data in iterations or in a sequence. In some aspects, the query generator module 120 may comprise an embeddings generator model.

The computing device 104 may execute a KM communication module 122 configured to interact with at least one of the KM service providers 142, 144, 146 by transmitting a prompt generated by the query generator module 120 for input into at least two of the selected KM service providers 142, 144, 146 and to obtain responses from each respective KM service provider. Generally, the KM communication module 122 is responsible for managing the interactions between the KM service providers 142, 144, 146 and modules from the knowledge model aggregation module 110. The primary function of the KM communication module 122 is to handle the exchange of data between the knowledge model aggregation module 110 and the KM service providers 142, 144, 146 to ensure that the inputs and output of the KM are effectively communicated to the appropriate destinations. This module serves as the interface layer that facilitates communication to enable the KM service providers 142, 144, 146 to integrate into the system 100.

In some aspects, the KM communication module 122 is configured to provide an application programming interface (API) that the knowledge model aggregation module 110 utilizes to interact with the KM service providers 142, 144, 146. As a non-limiting example, this may include handling API requests and responses from the KM service providers 142, 144, 146, managing authentication and authorization for secure access, or supporting different API protocols (e.g., REST, WebSocket) to accommodate various integration needs.

In some aspects, the KM communication module 122 may be configured to integrate with external systems and databases such as a results database 132. This may involve fetching additional data needed to answer a query or enabling bidirectional communication between the KM service providers 142, 144, 146 and external systems (e.g., CRM software, knowledge bases, or real-time data feeds). In some aspects, the KM communication module 122 may collect and manage data related to user preferences or behavior to deliver personalized responses by accessing the results database 132.

The computing device 104 may execute a results analyzer module 124 configured to combine selected portions of responses from knowledge models into an aggregated response. Generally, the results analyzer module 124 is responsible for evaluating, refining, and post-processing the outputs generated by the KMs from the KM service providers 142, 144, 146. In other words, the results analyzer module 124 ensures that the results produced by the KMs from the KM service providers 142, 144, 146 are accurate, relevant, coherent, and aligned with the user's needs.

In some aspects, the results analyzer module 124 is configured to assess the quality of the generated output based on predefined criteria, such as relevant, accuracy, fluency, grammatical correctness, and coherence. In some aspects, the results analyzer module 124 may be configured to check whether the generated responses is relevant to the user's query or the task at hand. In some aspects, the results analyzer module 124 may filter out or flag irrelevant, off-topic, or nonsensical outputs. In some aspects, the user may use the UI to mark portions of the responses from the LLM models as important, not important, or neutral. These marked portions may be stored in the results database 132.

The computing device 104 may execute a display module 126. The display module 126 may be configured to generate and display the query from the user and at least one aggregated response from two or more KM service providers 142, 144, 146. Generally, the display module 126 is responsible for managing and rendering the visual components of the user interface by handling the presentation of information to the user, ensuring that data and controls are displayed correctly and consistently across the UI.

In some aspects, the display module 126 is configured to render or draw all the elements of the UI, such as windows, buttons, text fields, menus, icons, images, and other components. In some aspects, the display module 126 is configured out update the UI when the data changes or user interactions occur (e.g., clicking a button or typing in a text box) such that the display module updates the UI accordingly. This could mean refreshing a portion of the screen, changing the state of a button, or displaying new data. In other words, the display module 126 may be considered the "view" part of a model-view-controller (MVC) or similar design pattern. It serves as the layer that presents data to the user and receives input to and from the computing device 104.

It should be noted that the identification of subject matter in the queries described in the present disclosure are heavily simplified. One skilled in the art will appreciate that the LLMs utilized may have significantly large datasets with highly specific details. For example, the query may include subtle descriptions of different subject matter. This type of analysis would be beyond the capabilities of the human mind because the amount of data to be identified, considered, and processed when detecting and identifying subject matter in a query is unfathomable.

Figure 2:
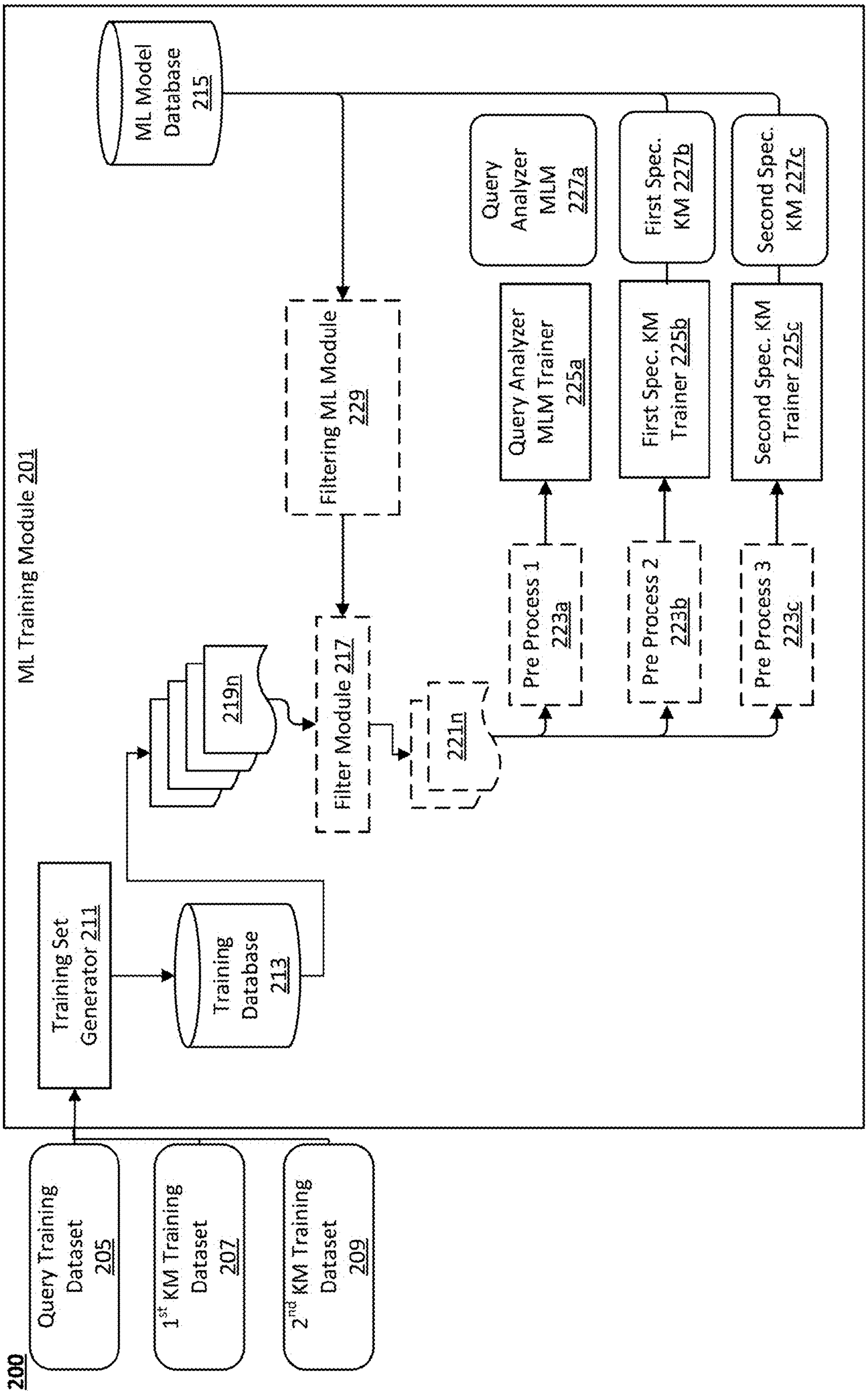
FIG. 2 is a block diagram illustrating a system for training machine learning models to identifying subject matter in a query according to aspects of the present disclosure.

FIG. 2 is a block diagram illustrating a system for preparing machine learning models to aggregate knowledge from a plurality of specialized knowledge models according to aspects of the present disclosure. As shown in example 200, a ML training module 201 is configured to build and train specialized machine learning models with inference to perform particular tasks. This enables the specialized machine learning models to develop an ability to perform particular objectives on inputs that are not part of a training dataset. By subjecting the specialized machine learning models to large amounts of unlabeled and/or labeled training data sets, the specialized machine learning models may perform particular tasks such as determining whether a query is directed to two or more different subject matter areas.

Supervised learning is effective for tasks such as classification (assigning inputs to predefined categories) and regression (predicting continuous values) since it relies on the availability of labeled data for both training and evaluation phases. In supervised learning, the ML training module 201 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the ML training module 201 provides the algorithm with a training dataset including input-output pairs. The algorithm learns the mapping function that relates inputs to outputs through an iterative process, adjusting its internal parameters based on the provided examples.

During model building, the algorithm creates a model that can generalize from the training data to make predictions on new, unseen data. The model's complexity varies based on the algorithm used. For example, the model may be a simple linear regression model or a complex neural network. During the prediction phase, the ML training module 201 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the ML training module 201 includes at least a training database 213 configured to store the raw training data 219*n* and corresponding labels, a ML model database 215 to store the trained models (e.g., query analyzer MLM 227*a*, first specialized knowledge model 227*b*, second specialized knowledge model 227*c*). In some aspects, the ML training module 201 may include an optional filtering machine learning model 229 and an optional filter module 217 configured to filter data from the training database 213 for training by removing poorly generated training data.

Training data from the query training dataset 205, first knowledge model training dataset 207, and second knowledge model training dataset 209 is received into the ML training module 201 via the training set generator 211. The query training dataset 205 includes at least queries including examples of single-subject queries or multi-subject queries. The first knowledge model training dataset 207 includes at least domain-specific data in the subject matter of the first sub-query to master at least one of language, concepts, or reasoning within a particular field. The second knowledge model training database 209 includes at least domain-specific data in the subject matter of the second sub-query to master at least one of language, concepts, or reasoning within a particular field. Details about the data included in each training dataset is described in more detail above with FIG. 1.

An optional filter ML module 229 is configured to filter out bad training data in order to clean up the training data in the training dataset 219*n*. In some examples, the optional filter module 217 may be a neural network. In some examples, the optional filter module 217 is a mathematical model. In some examples, the cleaned training dataset 221*n* then undergoes optional preprocessing steps depending on which neural network or model is being trained.

The optional preprocess 1 223*a*, preprocess 2 223*b*, preprocess 3 223*c*, are automated processes that modify the raw data received from 219*n* (or cleaned training dataset

221*n*) and prepare the raw data as input to the respective model trainers (e.g., query analyzer MLM trainer 225*a*, first specialized knowledge model trainer 225*b*, second specialized knowledge model trainer 225*c*). These may be described in the ML training module 201 as snippets of code that prepares the datasets. In some examples, the preprocessing module (e.g., preprocess 1 223*a*, preprocess 2 223*b*, preprocess 3 223*c*) for a particular trainer may be an automated script or code that will be setup the first time any model is trained.

The query analyzer MLM trainer 225*a*, first specialized knowledge model trainer 225*b*, second specialized knowledge model trainer 225*c* are the scripts or code that train the respective models. The query analyzer MLM trainer 225*a*, first specialized knowledge model trainer 225*b*, second specialized knowledge model trainer 225*c* may be a script or code that holds the instructions on how a model should be trained (e.g., optimization method, model architecture, dataset division, etc.) and also runs the training. The query analyzer MLM trainer 225*a*, first specialized knowledge model trainer 225*b*, second specialized knowledge model trainer 225*c* each take as input the raw or filtered processed training data and train the query analyzer MLM 227*a*, first specialized knowledge model 227*b*, or second specialized knowledge model 227*c* to achieve their specific objectives, respectively.

In summary, the raw dataset 219*n* or cleaned dataset 221*n* may optionally go through different preprocessing steps 223*a*, 223*b*, 223*c* and then a corresponding query analyzer MLM trainer 225*a*, first specialized knowledge model trainer 225*b*, second specialized knowledge model trainer 225*c* to generate a trained query analyzer MLM 227*a*, first specialized knowledge model 227*b*, or second specialized knowledge model 227*c*. In some examples, each of these models may be a LLM or a neural network.

As a non-limiting example and as discussed above, the machine learning may be a neural network. The neural network models are designed using a set of hyperparameters that define high-level aspects of their architecture and training process. These hyperparameters include, but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 219*n* used for training may include noise and bad training images from the training database 213. Accordingly, to create a clean and filtered training dataset, the optional filter module 217 is configured to filter out unwanted data points from the raw training dataset 219*n* by developing smaller, less accurate systems based on patterns and metadata information.

During the training process, the query analyzer MLM trainer 225*a*, first specialized knowledge model trainer 225*b*, second specialized knowledge model trainer 225*c* are presented with input data and labels of actual values, and the optimization objective, which aims to minimize the difference between the actual value and the predicted value, is calculated. The optimization algorithm updates the parameters of the query analyzer MLM trainer 225*a*, first specialized knowledge model trainer 225*b*, second specialized knowledge model trainer 225*c* to reduce the value of the objective. This process is repeated for several iterations until the parameters do not change anymore. This process is repeated for various combinations of hyperparameters, and the model with the smallest label prediction error is selected as the final model.

When a new model (e.g., trained query analyzer MLM 227*a*, first specialized knowledge model 227*b*, second specialized knowledge model 227*c*) is created, and a new process for filtering and automated labeling is established, it is added to the ML model database 215 in the ML training module 201. This enables the new model to be part of the closed-loop model update process. Optionally, at regular intervals, data which is continuously collected can be filtered, labeled, and used to update old models by an optional filtering machine learning module 229. In some examples, the optional filtering machine learning module 229 is a neural network. In some examples, the optional filtering machine learning module 229 is a mathematical model. This approach may capture changes in the data over time.

It should be noted that although only two knowledge model trainers and specialized knowledge models are shown, the present disclosure can include any number of specialized knowledge models.

Figure 3:
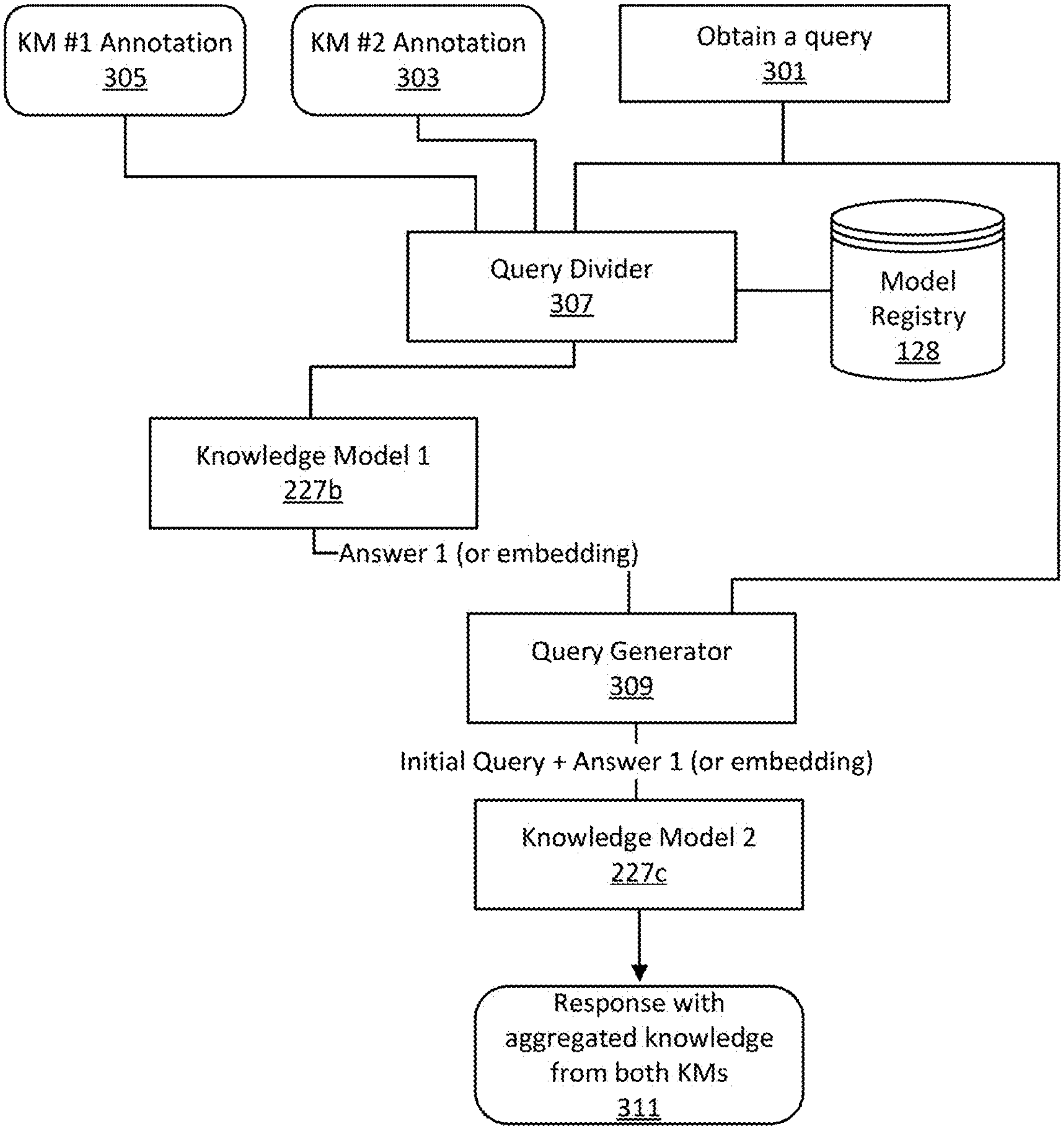
FIG. 3 is a diagram for generating a response with aggregated knowledge from two knowledge models according to aspects of the present disclosure.

FIG. 3 is a diagram for generating a response with aggregated knowledge from two knowledge models according to aspects of the present disclosure. In various implementations, the method 300 is performed by a device with one or more processors and non-transitory memory that performs intent prediction. In some implementations, the method 300 is performed by processing logic, including hardware, firmware, software, or a combination thereof. In some implementations, the method 300 is performed by a processor executing code stored in a non-transitory computer-readable medium (e.g., a memory). The method 300 describes a method for aggregating knowledge from two knowledge models in a response.

Figure 4A:
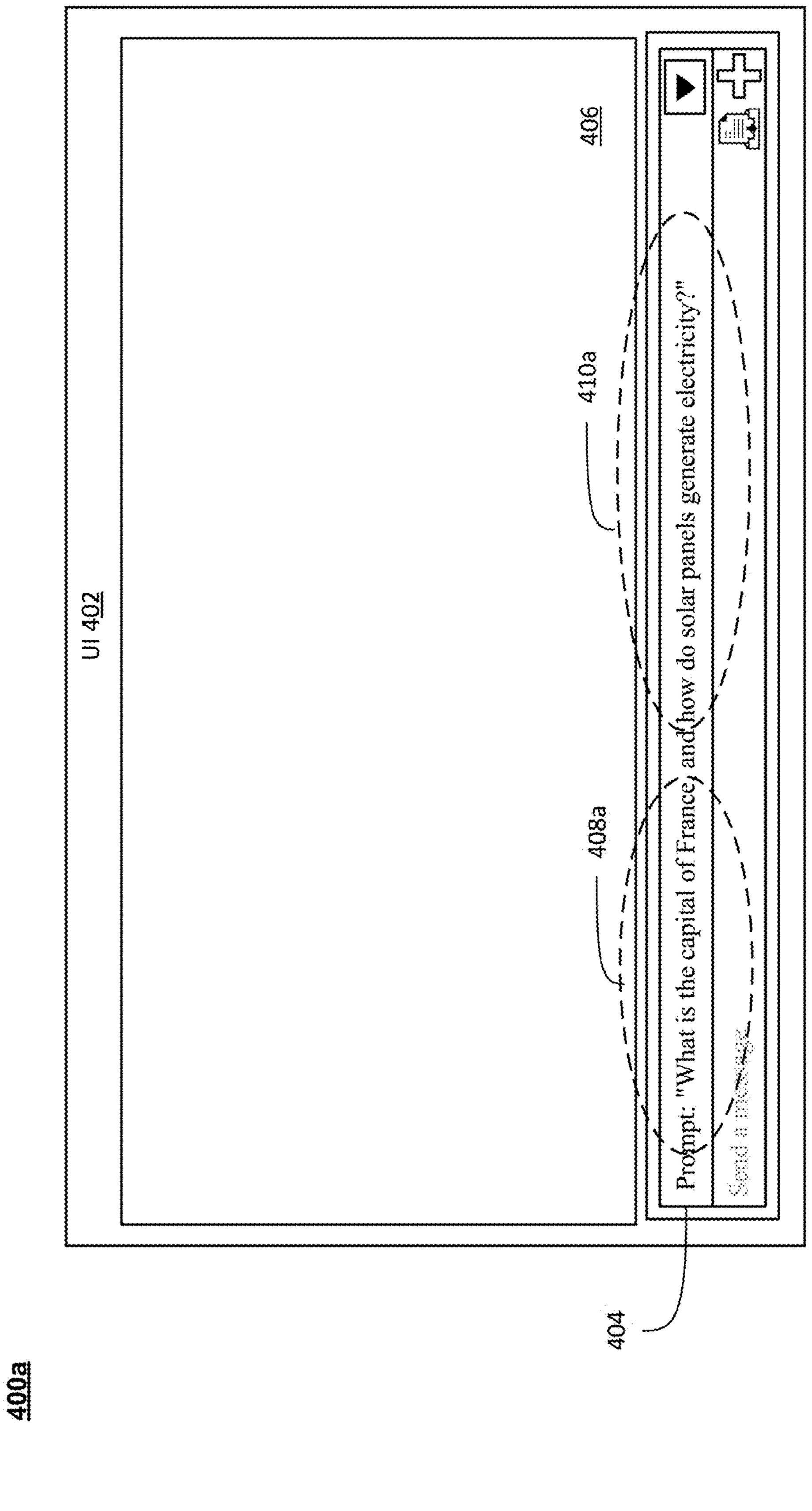
Figure 5A:
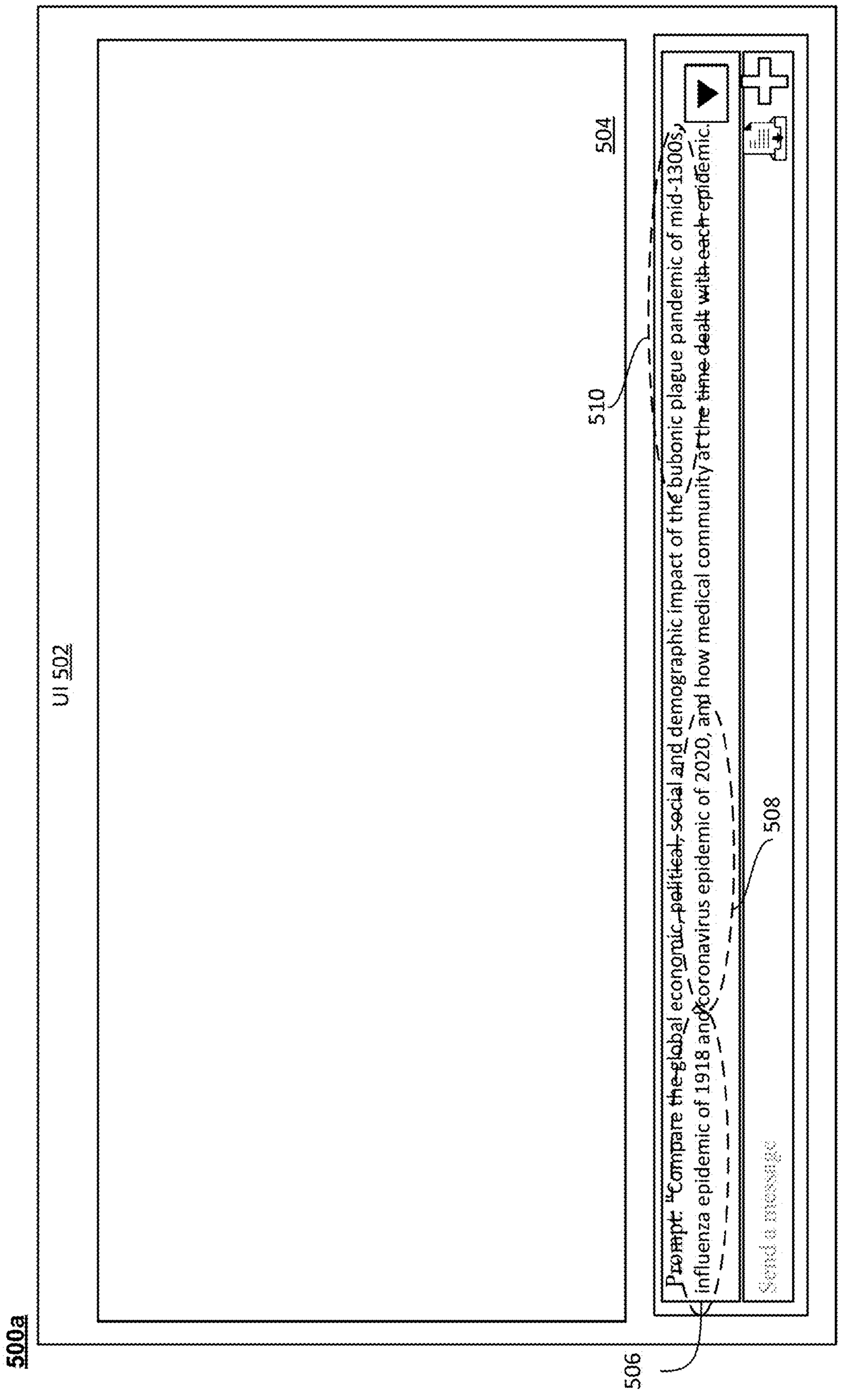
FIGS. 5A-5B are diagrams illustrating a method for generating a response with aggregated knowledge from three knowledge models according to aspects of the present disclosure.

The method 300 includes obtaining a query 301 that contains two or more different subject matters from a user. As an example, the query may be "generate an assessment for a student for physics." As shown in FIG. 4A, the query may be "What is the capital of France and how do solar panels generate electricity?". As shown in FIG. 5A, the query may be "Compare the global economic, political, social and demographic impact of the bubonic plague pandemic of mid-1300s, influenza epidemic of 1918 and coronavirus epidemic of 2020, and how medical community at the time dealt with each epidemic."

The method 300 may include the query divider 307 obtaining a first knowledge model annotation 305, a second knowledge model annotation 303, and the query 301. In some aspects, the first knowledge model annotation 305 and a second knowledge model annotation 303 may be stored in a model registry 128. The query divider 307 uses the query 301 in conjunction with the first knowledge model annotation 305, the second knowledge model annotation 303, and the model registry 128 to contextualize and enhances its understanding. Following on the previous example, since the query may be "generate an assessment for a student for physics," the query divider 307 may determine that two different subject matters are included in the query—the first for the student and the second of physics.

The query divider 307 consults the model registry 128 to select appropriate knowledge models for generating embeddings based on the query 301 and the first knowledge model annotation 305 and a second knowledge model annotation 303. The model registry 128 is a repository or directory containing information about the available knowledge models such as annotation of all models and technical information. In some examples, the model registry 128 may provide metadata about the knowledge models (e.g., purpose, training data, usage constraints, version of models, interfaces, etc.) and manages their lifecycle.

The first knowledge model annotation 305 may represent the initial processing of the query using a specific knowledge model. In some aspects, the first knowledge model 227*b* may analyze the query's syntax, semantics, or intent to generate structured metadata or features. For example, the first knowledge model annotation 305 may identify entities, keywords, or the general domain of the query.

The second knowledge model annotation 303 may build on or compliment the first by focusing on additional layers of processing or refining the initial annotations. For example, the second knowledge model annotation 303 may focus on more domain-specific features, context refinement, or cross-referencing the query 301 with a knowledge base. As mentioned above, the query 301 is the user-provided input that the query divider 307 aims to analyze and embed.

Specifically, the query divider 307 combines the raw query 301 with the first knowledge model annotation 305 and the second knowledge model annotation 303 from the first knowledge model 227*b* and second knowledge model 227*c*. The knowledge model annotations provide a multi-faceted representation of the query's structure and semantics.

By using the model registry 128, the query divider 307 determines which embedding model(s) are best suited for processing the query 301. The query 301 is passed through the selected embedding models, which may use neural network architectures like transformers to generate vector representations (embeddings). The embeddings are then further refined by integrating insights from the annotations. For example, the first knowledge model's output might influence the embedding space to emphasize high-level semantics and the second knowledge model might adjust embeddings to highlight domain-specific nuances. The final embedding is a compact vector that captures the query's meaning, enriched by the multi-model annotations and tailored to the specific requirements indicated by the model registry 128.

Here, following on the previous example, since the query is "generate an assessment for a student for physics," the query divider 307 may determine that two different (e.g., physically and logically) specialized knowledge models such as one relating to the student and another related to physics should be used to answer the query since the query is divided into two different fields of knowledge (e.g., student, and physics).

The query 301 is input into the first knowledge model 227*b* in order to generate a response (or embedding). As an example, referring back to the query "generate an assessment for a student for physics," the first knowledge model 227*b* may correspond to physics knowledge model (RAG, LORA, graph) and the first knowledge model 227*b* will generate a response using the first knowledge model 227*b*.

The response (e.g., or embeddings) from knowledge model 1 227*b* along with the query 301 are then input into a query generator 309 for contextual data sharing purposes. In some aspects, the query generator may work with natural language or embeddings. Specifically, the query generator 309 may generate a query including at least the initial query 301 and the response from the first knowledge model 1 227*b* as input into a second knowledge model 227*c*. As an example, the second knowledge model 227*b* may correspond to a knowledge model concerning the student (RAG, LORA, graph) with data from a learning management system.

As an example, referring back to the initial query "generate an assessment for a student for physics," the query generator 309 will generate a query into the second knowledge model 227*c* that includes at least the initial query of "generate an assessment for a student for physics" and the response from the first knowledge model 227*b*. In this way, the second knowledge model 227*c* will have contextual data from the first knowledge model 227*b* when forming its own response.

Finally, the second knowledge model 227*c* will generate a response with aggregated knowledge 311 from both the first knowledge model 227*b* and the second knowledge model 227*c*.

FIGS. 4A-4B are diagrams illustrating a method for generating a response with aggregated knowledge from two knowledge models according to aspects of the present disclosure.

As shown in example 400*a*, the UI 402 displays 406 at least a prompt 404 that may contain a query related to two subject matters. The prompt 404 asks "What is the capital of France and how do solar panels generate electricity." As an example, referring back to FIGS. 1-2, a prepared query analyzer MLM 227*a* from the query analyzer MLM module 116 may identify that the first part of the query 408*a* (e.g., what is the capital of France) corresponds to a subject matter of France and the second part of the query 410*a* (e.g., how do solar panels generate electricity) corresponds to a different subject matter of science.

As shown in example 400*b*, the UI 402 displays a first response 408*b* (The capital of France is Paris) corresponding to the first part of the query 408*a* and a second response 410*b* (How Solar Panels Generate Electricity . . . ) corresponding to the second part of the query 410*a*.

Figure 5B:
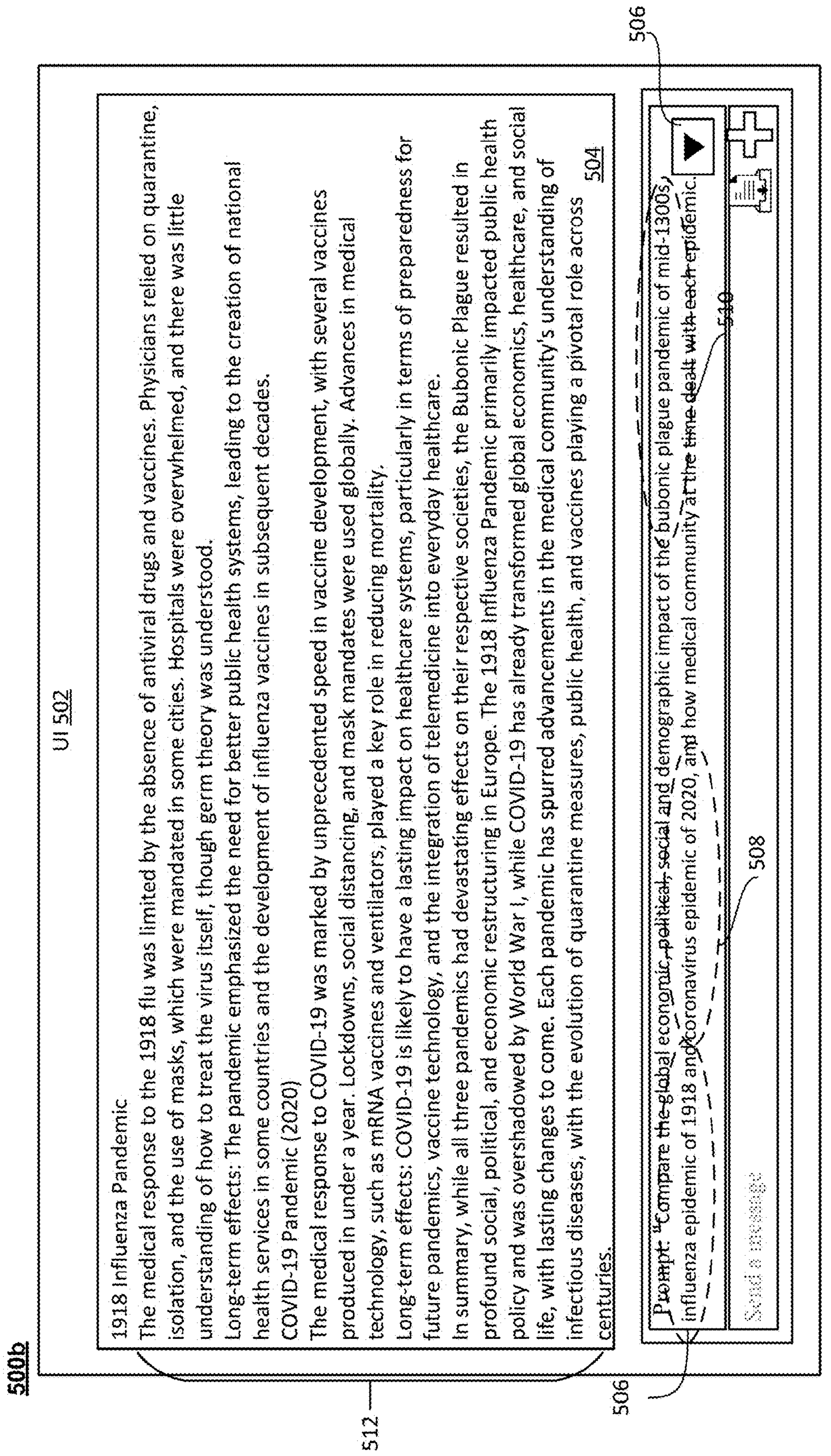

FIGS. 5A-5B are diagrams illustrating a method for generating a response with aggregated knowledge from three knowledge models according to aspects of the present disclosure.

As shown in example 500*a*, the UI 502 displays 504 a prompt that may contain a query related to multiple subject matters. The prompt asks "Compare the global, political, social, and demographic impact of the bubonic plague pandemic of mid-1300s, influenza epidemic of 1918 and coronavirus epidemic of 2020, and how medical community at the time dealt with each epidemic. As an example, referring back to FIGS. 1-2, a prepared query analyzer MLM 227*a* from the query analyzer MLM module 116 may identify that the first part of the query 506 (e.g., influenza epidemic of 1918) corresponds to a subject matter of influenza, the second part of the query 508 (e.g., corona virus epidemic of 2020) corresponds to a different subject matter of coronavirus, and a third part of the query 510 (e.g., bubonic plague pandemic of mid-1300s) corresponds to a yet another different subject matter of bubonic plague.

As shown in example 500*b*, the UI 502 displays a response 512 that integrates a response from knowledge models corresponding to an influenza knowledge model, a coronavirus knowledge model, and a bubonic plague knowledge model.

Figure 6:
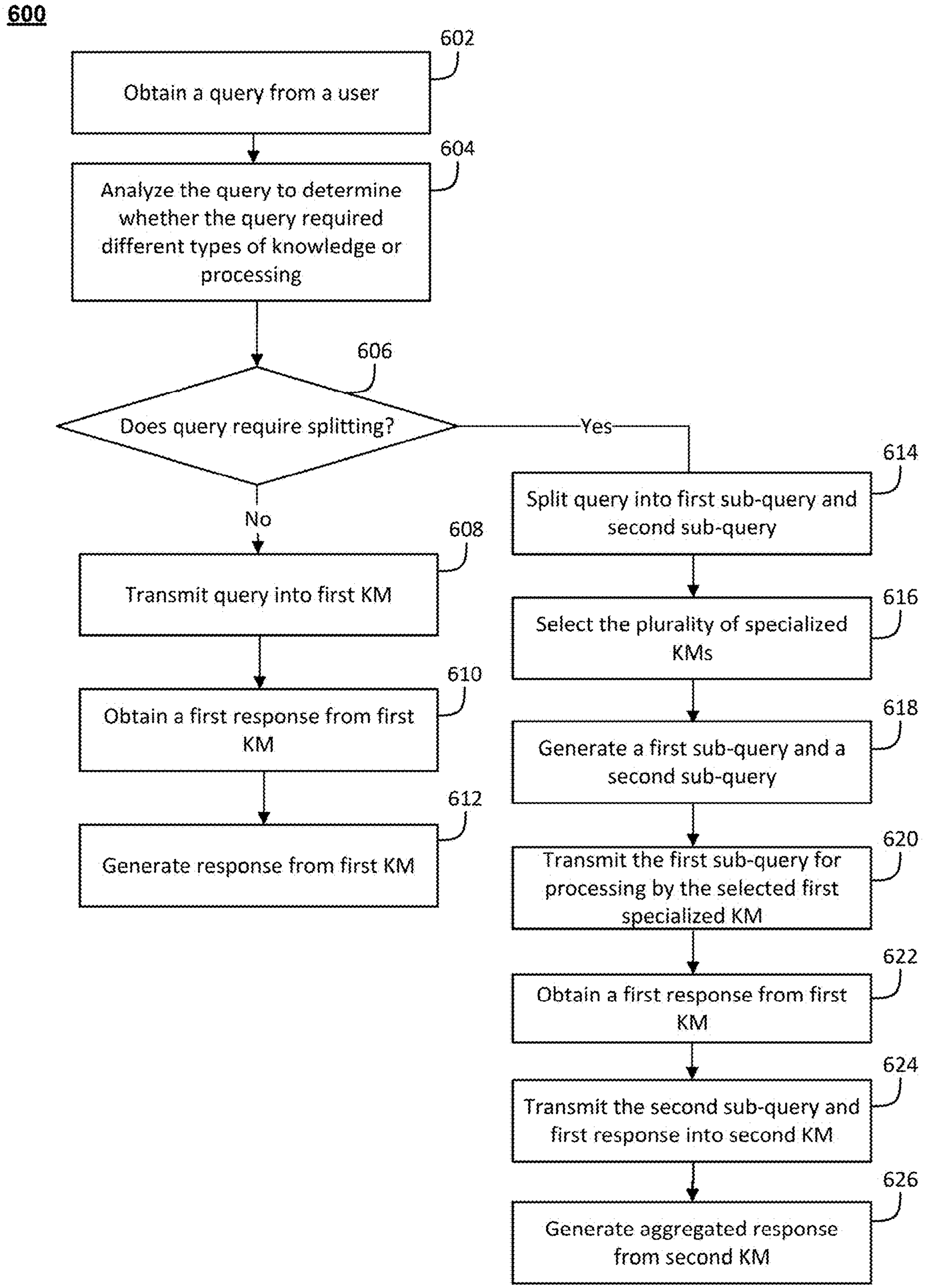
FIG. 6 is a method for aggregating knowledge from a plurality specialized knowledge models according to some aspects of the present disclosure.

FIG. 6 is a method for aggregating knowledge from a plurality specialized knowledge models according to some aspects of the present disclosure. In various implementations, the method 600 is performed by a device with one or more processors and non-transitory memory that performs intent prediction. In some implementations, the method 600 is performed by processing logic, including hardware, firmware, software, or a combination thereof. In some implementations, the method 600 is performed by a processor executing code stored in a non-transitory computer-readable medium (e.g., a memory). The method 600 describes a method for aggregating knowledge from a plurality specialized knowledge models.

At 602, the method 600 includes receiving a query from a user.

At 604, the method 600 includes analyzing, using a query analyzer machine language model (MLM), the query to determine that the query is directed to two or more different subject matter areas. In some aspects, the MLM may corresponds to a model with an interface and enable users to work with text (e.g., not just LLM). As an example, the MLM with the interface may have text interface, but work in vector format (e.g., RAG).

In some aspects, analyzing the query to determine if the query is directed to two or more different subject matter areas by: performing a tokenization process by breaking down the query into tokens for the query analyzer MLM model to process; and using n-grams to capture context and relationships between words.

In some aspects, the method 600 may include training the query analyzer MLM to determine if the query is directed to two or more different subject matter areas based on using a training dataset comprising at least queries including examples of single-subject queries and multi-subject queries.

At 606, the method 600 includes determining whether the query requires splitting.

If the query does not require splitting, then, at 608, the method 600 includes transmitting the query into the first knowledge model. At 610, the method 600 includes obtaining a first response from the first knowledge model. At 612, the method 600 includes generating a response from the first knowledge model.

If the query requires splitting, then, at 614, the method 600 includes splitting the query into a first sub-query and second sub-query.

At 616, the method 600 includes selecting, from a KM registry comprising information about a plurality of specialized KMs each having a distinct subject matter expertise, the plurality of specialized KMs each having respective expertise in one of the two or more different subject matter areas of the query.

In some aspects, the information for specialized KM comprises at least one of: a model name, subject matter expertise that the specialized KM is trained to handle, a version or iteration of the specialized KM, base model architecture, model type, fine-tuning dataset used to fine-tune the specialized KM for its specific subject matter expertise, a number of parameters, accuracy/precision/recall/F1 score, benchmarks, inference speed, resource requirements, training data sources, training time, hardware used, optimization techniques, or API detail, deployment requirements, update date, or license information.

In some aspects, the specialized KM is an object comprising a MLM with application programming interfaces (API) for questions-answers and associated annotation from the KM registry.

At 618, the method 600 includes generating, using a query generator, a first sub-query directed to the first subject matter of the query and a second sub-query directed to the second subject matter of the query.

In some aspects, the query generator comprises an natural language processing MLM, and first sub-query and a second sub-query comprise two different natural language queries. In some aspects, the query generator comprises a MLM prepared for processing physical data models based at least in part on transmitting data in iterations or in a sequence (inputs and outputs). In some aspects, each specialized model contains special description (e.g., annotations) which are used as context for query generator to generate first-sub query directed to the first subject matter of the query and a second sub-query directed to the second subject matter of the query. This may be done by pairs, all at once, or by evaluating by scale (e.g., benchmarking). In some aspects, if the benchmark is a low evaluation then that particular model is not being used. In some aspects, if the benchmark is a low evaluation, then the two best models are chosen. In some aspects, the two best models may be used in parallel or in sequence (e.g., by using answer from one model as context for the next).

In some aspects, the query generator comprises an embeddings generator model, and the first sub-query and the second sub-query may include two different embedding vectors.

Optionally, in some aspects, the query generator is configured to: process the query and identify distinct subject matters using the query generator, classify the distinct subject matters by using a Latent Dirichlet Allocation (LDA) or pre-trained topic classifier to determine the subject of different segments of the query, and generate sub-queries for each subject matter.

At 620, the method 600 includes transmitting the first sub-query for processing by the selected first specialized KM having expertise in the subject matter of the first sub-query.

Optionally, in some aspects, the method 600 includes: transmitting a request to an application programming interface (API) for the first specialized KM with the query, wherein the API processes the query by routing the query to the first specialized KM for processing the query and generating the first response; and transmitting a request to an API for the second specialized KM with the query and the first response, wherein the API processes the query by routing the query and the first response to the second specialized KM for processing the query and generating the aggregated response.

At 622, the method 600 includes obtaining a first response from the first specialized KM based on the first sub-query.

At 624, the method 600 includes transmitting the second sub-query and the first response from the first specialized KM for processing by the selected second specialized KM having expertise in the subject matter of the second sub-query.

In some aspects, transmitting the second sub-query and the first response from the first specialized KM further comprises: in response to obtaining a first prompt from the user, adding the query and the obtained first response from the first specialized KM to the second sub-query; and in response to obtaining a second prompt from the user, adding a prompt for answering the second sub-query in context with the obtained first response from the first specialized KM to the second sub-query. As an example, the first prompt may include "original prompt+answer from the first model" and the second prompt may include "answer the question in context with the answer from the first mode."

Optionally, in some aspects, the method 600 may include: training the first specialized KM having expertise in the subject matter of the first sub-query based on using a training dataset comprising domain-specific data in the subject matter of the first sub-query to master at least one of language, concepts, or reasoning within a particular field; and training the second specialized KM having expertise in the subject matter of the second sub-query based on using a training dataset comprising domain-specific data in the subject matter of the second sub-query to master at least one of language, concepts, or reasoning within a particular field.

In some aspects, the first specialized KM and the second specialized KM correspond to at least one of a Retrieval-Augmented Generation (RAG), Low-Rank Adaption (LORA), or Graph Neural Networks (GNN).

At 626, the method 600 includes generating, for display on a user interface (UI), an aggregated response from the second specialized KM, wherein the aggregated response combines knowledge from both the first specialized KM and the second specialized KM. In some aspects, the first response and aggregated response may include one of a natural language or embeddings vectors.

Optionally, the method 600 includes generating, for display on the UI, each response from the first specialized KM or the second specialized KM.

Figure 7:
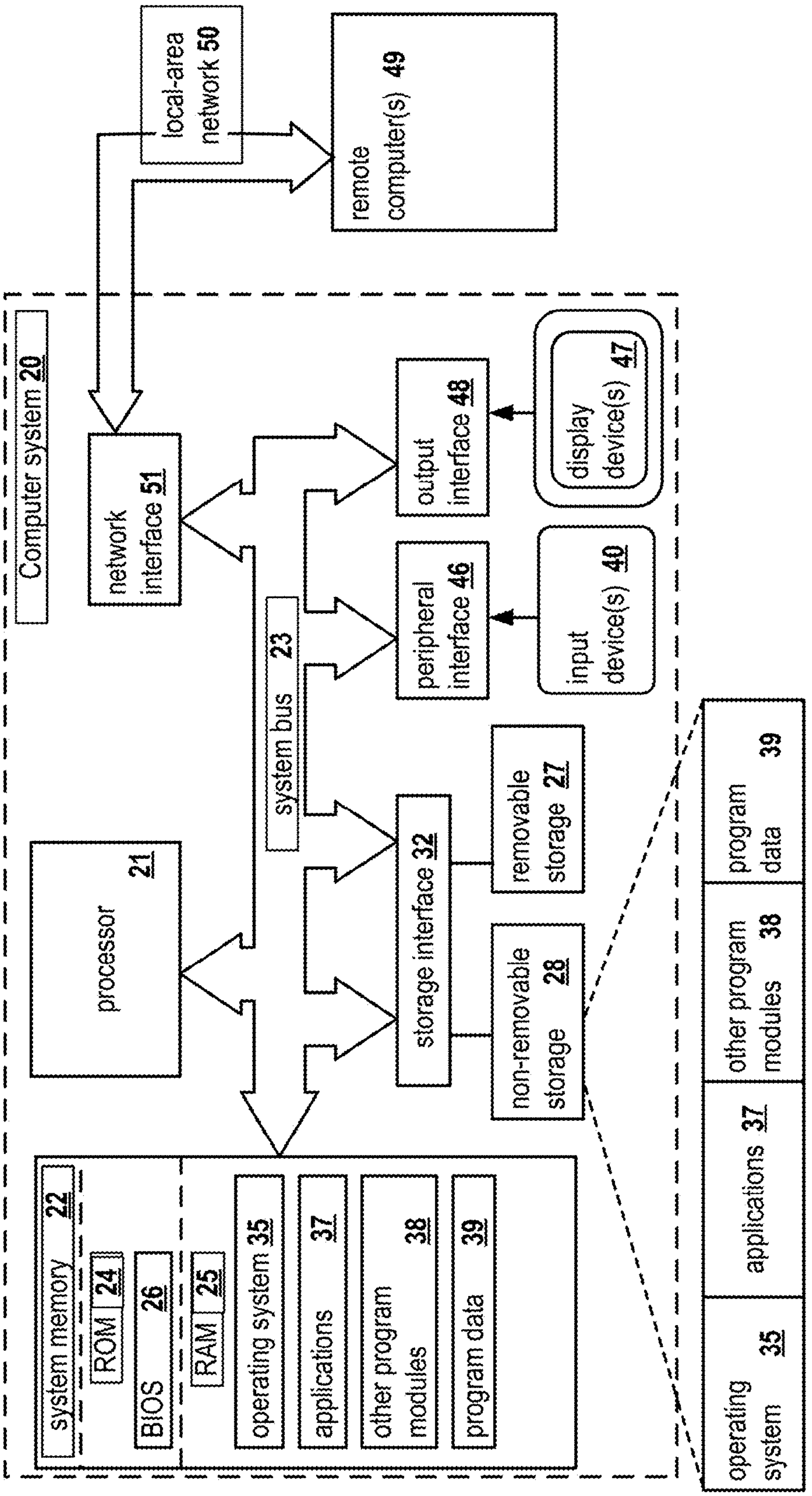
FIG. 7 presents an example of a general-purpose computer system on which aspects of the present disclosure can be implemented.

FIG. 7 is a block diagram illustrating a computer system 20 on which aspects of systems and methods for aggregating knowledge from a plurality of specialized knowledge models may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for aggregating knowledge from a plurality specialized knowledge models (KMs), the method comprising:

receiving a query from a user;

analyzing, using a query analyzer machine language model (MLM), the query to determine that the query is directed to two or more different subject matter areas;

selecting, from a KM registry comprising information about a plurality of specialized KMs each having a distinct subject matter expertise, the plurality of specialized KMs each having respective expertise in one of the two or more different subject matter areas of the query;

generating, using a query generator, a first sub-query directed to the first subject matter of the query and a second sub-query directed to the second subject matter of the query;

transmitting the first sub-query for processing by the selected first specialized KM having expertise in the subject matter of the first sub-query;

obtaining a first response from the first specialized KM based on the first sub-query;

transmitting the second sub-query and the first response from the first specialized KM for processing by the selected second specialized KM having expertise in the subject matter of the second sub-query; and generating, for display on a user interface (UI), an aggregated response from the second specialized KM, wherein the aggregated response combines knowledge from both the first specialized KM and the second specialized KM.

2. The method of claim 1, wherein the query generator comprises a natural language processing MLM, and first sub-query and a second sub-query comprise two different natural language queries.

3. The method of claim 2, wherein the query generator comprises a MLM prepared for processing physical data models based at least in part on transmitting data in iterations or in a sequence.

4. The method of claim 1, wherein the query generator comprises an embeddings generator model, and the first sub-query and the second sub-query comprises two different embedding vectors.

5. The method of claim 1, wherein the first response and aggregated response include one of natural language or an embeddings vector.

6. The method of claim 1, further comprising:

generating, for display on the UI, each response from the first specialized KM or the second specialized KM.

7. The method of claim 1, wherein the first specialized KM and the second specialized KM correspond to at least one of a Retrieval-Augmented Generation (RAG), Low-Rank Adaption (LORA), or Graph Neural Networks (GNN).

8. The method of claim 1, further comprising:

transmitting a request to an application programming interface (API) for the first specialized KM with the query, wherein the API processes the query by routing the query to the first specialized KM for processing the query and generating the first response; and transmitting a request to an API for the second specialized KM with the query and the first response, wherein the API processes the query by routing the query and the first response to the second specialized KM for processing the query and generating the aggregated response.

9. The method of claim 1, further comprising:

training the query analyzer MLM to determine if the query is directed to two or more different subject matter areas based on using a training dataset comprising at least queries including examples of single-subject queries and multi-subject queries.

10. The method of claim 1, analyzing the query to determine if the query is directed to two or more different subject matter areas by:

performing a tokenization process by breaking down the query into tokens for the query analyzer MLM model to process; and using n-grams to capture context and relationships between words.

11. The method of claim 1, further comprising:

training the first specialized KM having expertise in the subject matter of the first sub-query based on using a training dataset comprising domain-specific data in the subject matter of the first sub-query to master at least one of language, concepts, or reasoning within a particular field; and training the second specialized KM having expertise in the subject matter of the second sub-query based on using a training dataset comprising domain-specific data in the subject matter of the second sub-query to master at least one of language, concepts, or reasoning within a particular field.

12. The method of claim 1, wherein the query generator is configured to:

process the query and identify distinct subject matters using the query generator, classify the distinct subject matters by using a Latent Dirichlet Allocation (LDA) or pre-trained topic classifier to determine the subject of different segments of the query, and generate sub-queries for each subject matter.

13. The method of claim 1, wherein the information for specialized KM comprises at least one of:

a model name, subject matter expertise that the specialized KM is trained to handle, a version or iteration of the specialized KM, base model architecture, model type, fine-tuning dataset used to fine-tune the specialized KM for its specific subject matter expertise, a number of parameters, accuracy/precision/recall/F1 score, benchmarks, inference speed, resource requirements, training data sources, training time, hardware used, optimization techniques, or API detail, deployment requirements, update date, or license information.

14. The method of claim 1, wherein the specialized KM is an object comprising a MLM with application programming interfaces (API) for questions-answers and associated annotation from the KM registry.

15. The method of claim 1, wherein transmitting the second sub-query and the first response from the first specialized KM further comprises:

in response to obtaining a first prompt from the user, adding the query and the obtained first response from the first specialized KM to the second sub-query; and in response to obtaining a second prompt from the user, adding a prompt for answering the second sub-query in context with the obtained first response from the first specialized KM to the second sub-query.

16. A system for aggregating knowledge from a plurality specialized knowledge models, the system comprising:

at least one memory; and at least one hardware processor coupled with the at least one memory and configured, individually or in combination, to:

receive a query from a user;

analyze, using a query analyzer machine language model (MLM), the query to determine that the query is directed to two or more different subject matter areas;

select, from a KM registry comprising information about a plurality of specialized KMs each having a distinct subject matter expertise, the plurality of specialized KMs each having respective expertise in one of the two or more different subject matter areas of the query;

generate, using a query generator, a first sub-query directed to the first subject matter of the query and a second sub-query directed to the second subject matter of the query;

transmit the first sub-query for processing by the selected first specialized KM having expertise in the subject matter of the first sub-query;

obtain a first response from the first specialized KM based on the first sub-query;

transmit the second sub-query and the first response from the first specialized KM for processing by the selected second specialized KM having expertise in the subject matter of the second sub-query; and generate, for display on a user interface (UI), an aggregated response from the second specialized KM, wherein the aggregated response combines knowledge from both the first specialized KM and the second specialized KM.

17. The system of claim 16, wherein the query generator comprises a natural language processing MLM, and first sub-query and a second sub-query comprise two different natural language queries.

18. The system of claim 16, wherein the query generator includes an embeddings generator model, and first sub-query and a second sub-query include two different embedding vectors.

19. The system of claim 16, wherein the first response and aggregated response include one of natural language or an embeddings vector.

20. A non-transitory computer readable medium storing thereon computer executable instructions for aggregating knowledge from a plurality specialized knowledge models, including instructions for:

receiving a query from a user;

analyzing, using a query analyzer machine language model (MLM), the query to determine that the query is directed to two or more different subject matter areas;

selecting, from a KM registry comprising information about a plurality of specialized KMs each having a distinct subject matter expertise, the plurality of specialized KMs each having respective expertise in one of the two or more different subject matter areas of the query;

generating, using a query generator, a first sub-query directed to the first subject matter of the query and a second sub-query directed to the second subject matter of the query;

transmitting the first sub-query for processing by the selected first specialized KM having expertise in the subject matter of the first sub-query;

obtaining a first response from the first specialized KM based on the first sub-query;

transmitting the second sub-query and the first response from the first specialized KM for processing by the selected second specialized KM having expertise in the subject matter of the second sub-query; and generating, for display on a user interface (UI), an aggregated response from the second specialized KM, wherein the aggregated response combines knowledge from both the first specialized KM and the second specialized KM.

* * * * *